Jan. 7, 1941. F. L. HAUSHALTER 2,227,969
RUBBER BEARING OR THE LIKE AND METHOD OF MAKING THE SAME
Filed Oct. 29, 1936
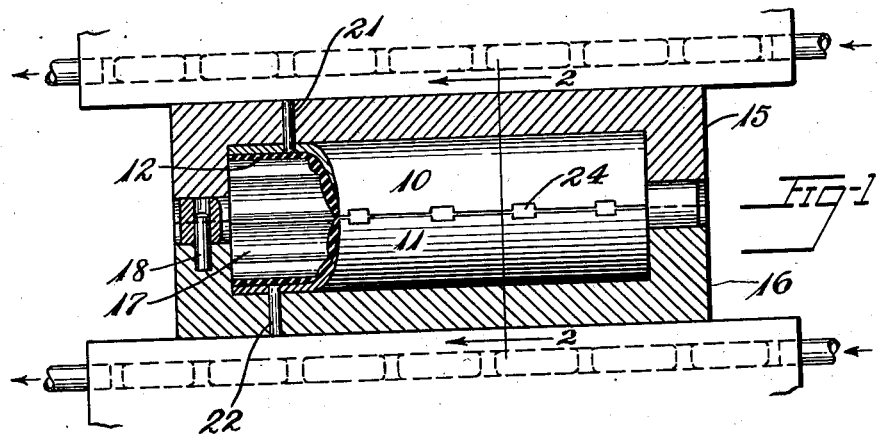
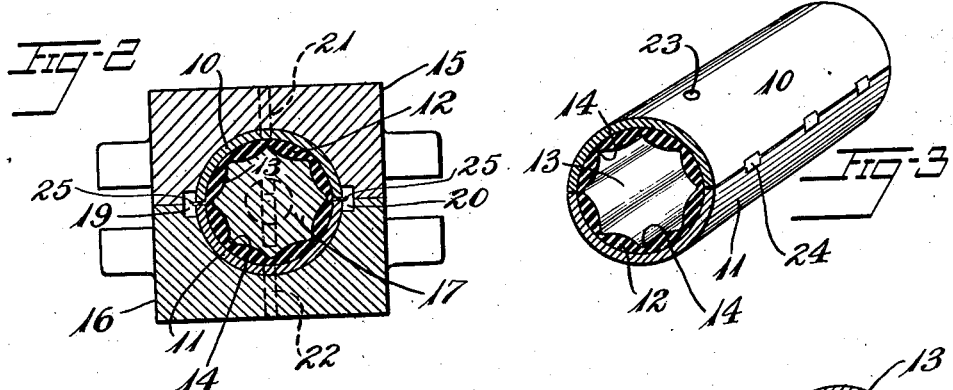
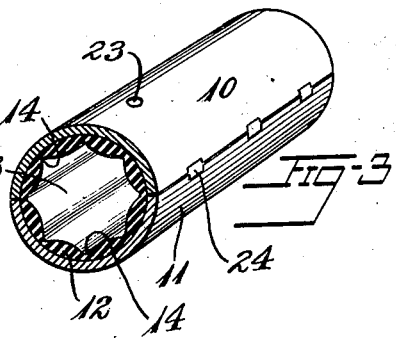
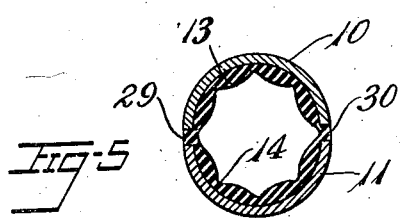
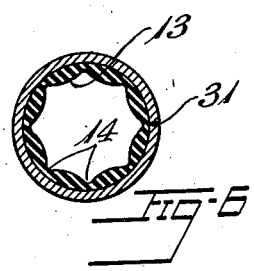
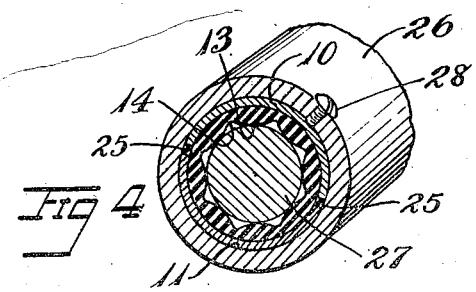
Inventor
Fred L. Haushalter
By
Attys Patented Jan. 7, 1941

2,227,969

UNITED STATES PATENT OFFICE 2,227,969

RUBBER BEARING OR THE LIKE AND METHOD OF MAKING THE SAME

Fred L. Haushalter, Akron, Ohio, assignor to The B. F. Goodrich Company, New York, N. Y., a corporation of New York Application October 29, 1936, Serial No. 108,243

14 Claims. (Cl. 29—84)

This invention relates to rubber bearings or the like, especially water-lubricated bearings, and to the method of making the same.

In the manufacture of articles comprising metal and vulcanized rubber parts attached to each other by vulcanization it has been found that where the rubber has been molded by forcing it in the direction of the surface of the metal so that sliding of the rubber over the metal occurs, poor adhesion is the result. Better adhesion results when the pressure is applied in the direction normal to the metal surface. In the manufacture of water-lubricated rubber bearings and similar articles wherein a rubber lining is molded in a sleeve, it has been customary to cement the rubber lining, usually in the form of a hollow cylinder, within the metal sleeve and then to insert a mandrel for molding the interior surface of the rubber, applying pressure axially of the sleeve to form the rubber between the sleeve and the mandrel. This method has been expensive and only partially satisfactory as difficulty in obtaining adhesion between the rubber and sleeve and complete filling of the space between the sleeve and the mandrel has been encountered. Entrapment of air has also occurred with this method. The difficulties of molding such articles by axially applied pressure increases as the length of the bearing is increased.

It has also been observed that after vulcanization of the rubber the rubber shrinks considerably more than the metal sleeve in cooling, thereby placing the rubber under a certain amount of tension. It is known that rubber under tension has less resistance to abrasion than rubber not under tension. When the rubber is vulcanized to the inner surface of a circumferentially continuous shell of metal, the shell resists the shrinking of the rubber except as to the relatively small amount permitted by shrinkage of the metal and undesirable tension in the rubber is often produced, and sometimes a weak union of rubber to metal results.

The principal objects of this invention are to provide security of attachment, solidity of the rubber body, and resistance to wear in a rubber bearing or the like, and to provide economy and efficiency of procedure in the manufacture of the same.

Other objects will appear from the following description and the accompanying drawing.

Of the drawing:

Fig. 1 is a longitudinal vertical cross-section of a mold used in practicing the method of the invention, a rubber lined bearing being shown in place in the mold, part of the bearing being broken away and part shown in section, and the press platens between which the mold is confined being conventionally indicated.

Fig. 2 is a transverse section, taken on line 2—2 of Fig. 1.

Fig. 3 is a perspective view of a completed rubber lined bearing in its preferred form.

Fig. 4 is a cross-sectional view showing a housing enclosing the bearing of Fig. 3 for support of a shaft.

Fig. 5 is a cross-sectional view of a modification showing a completed bearing when molded in oval shape.

Fig. 6 is a cross-sectional view of a modified form of the invention showing the metal sleeve made of a single piece of metal.

Referring to the drawing:

The invention contemplates the assembly and molding of a rubber lining to a metal sleeve structure by radially applied pressure and the simultaneous formation of the interior surface of the rubber lining. In the preferred form of the invention, as illustrated in Figs. 1 to 3, the metal sleeve is provided in two parts 10, 11 which are semi-cylindrical or nearly so, whereas the rubber lining 12 is molded in integral form and preferably is formed with longitudinally extending lands 13 separated by lubrication channels or grooves 14, to provide a water-lubricated bearing. The shape of the lands is preferably such as to induce maintenance of a film of lubricant and to this end the lands preferably are formed with faces which are convex, as taught by the Annis Patent No. 1,797,223.

The metal sleeve sections are of arcuate shape and may be formed from metal tubing although greater economy may be practiced by forming the sections from flat sheet metal by a stamping process. These metal parts may be made of a suitable rubber-adherent metal or they may be formed of another metal, such as steel, and then coated, as by electro-deposition, with a coating of rubber-adherent metal, or other suitable bonding material, such as a coating of polymerized rubber isomer.

The rubber composition for forming the lining 12 is prepared in unvulcanized sheet form and preferably is cemented to the inner face of each metal part. Where two or more metal parts are used a corresponding number of pieces of rubber are cemented to their inner faces. The metal parts with the rubber material attached thereto are then placed in a suitable mold such as that illustrated in Figs. 1 and 2.

The mold comprises a pair of mold plates 15, 16 formed with mating mold cavities adapted to support the metal shell parts 10, 11, and a core 17 adapted to be seated in reduced extensions of the mold cavities and to be held in place by a dowel 18. Overflow cavities 19, 20 are provided along the side margins of the metal parts to receive any excess rubber material, and the mold is preferably provided with dowels 21, 22 for engaging apertures, such as 23, in the metal parts for properly locating such parts with respect to the overflow cavities.

In molding the article, the metal parts carrying the rubber material are placed in the respective mold cavities and the mold plates are assembled about the core. Slightly more than enough rubber composition to fill the space is provided so that as the mold is closed, the excess rubber is squeezed out between the margins of the metal parts into the overflow cavities. Layers of rubber 25, 25 will be left between the part margins to serve purposes described hereinafter. The metal parts may be formed with notches 24, 24, if desired, to provide additional flow space making for equalization of pressure during the molding.

For unrestrained shrinkage and self adjustment of the bearing during the cooling from the heat of molding, the bearing is removed from the mold and the mandrel withdrawn for the cooling operation. By virtue of the cushions of rubber 25, 25 between the margins of the metal parts these parts are permitted to yield somewhat toward each other and thereby relieve at least partially the tension on the rubber resulting from shrinkage. This relief of tension makes for a stronger bond of the rubber to the metal by thwarting a pulling away of the rubber from the metal while the material is yet soft from the heat. The circumferentially discontinuous nature of the sleeve portions 10 and 11 has the further advantage of relieving pressure on the mandrel at the time the latter is withdrawn from the bearing, this being important especially where the frictional force between the rubber and the mandrel is increased as by the length of the bushing or complexity of the molded surface of the rubber.

In use, the bearing of Fig. 3 is mounted in a housing such as 26 of Fig. 4 for supporting a rotating shaft 27. The bearing may have a force-fit in the housing and for this the rubber cushions 19 and 20 act as springs resiliently maintaining the frictional engagement of the sleeve parts with the housing. If desired, suitable means such as the set screw 28, may be added to maintain the bearing in a fixed position in the housing.

The annular form of the rubber is further advantageous in that it holds the parts together as a unit so that handling and accurate installation of the bearing are facilitated.

If desired, the bearing may be molded with the shell parts spaced apart in non-circular relation, as by providing shims between the mold sections, and a mandrel of generally oval, rather than circular form, may be used to provide a bearing of the form of Fig. 5, in which the metal parts are considerably separated at 29 and 30. Owing to these relatively wide gaps, the overflow cavities in the mold are preferably dispensed with in this embodiment to assure good molding pressure. The rubber at the gaps 29 and 30 is effective during the shrinkage following the molding operation to relieve tension in the rubber very considerably by permitting the metal parts to yield toward each other considerably during the shrinking. In the final installation the rubber between the shell margins provides considerable resilience for urging the shells against the housing and holding the bearing tightly fitted therein. Substantial inward bulging of the rubber at the gaps 29 and 30 is permissible without objectionably affecting the shaft-contacting surface of the rubber where the rubber is so molded as to produce grooves, rather than lands, at these gaps, as shown.

In some cases, if desired, the bearing may comprise three or more metal sleeve parts, rather than two. Also, if desired, to facilitate assembly about the shaft, the bearing may be divided by knife cuts through the rubber at the margins of the metal parts, to provide bearings of less than a complete circle in circumferential extent, each comprising a segment having a rubber facing which may be formed with one or more bearing lands. The notches 24, 24, facilitate the cutting operations by permitting prying tools to be inserted for separating the metal parts to give access to the rubber for the cutting.

It is also possible, according to the invention, to use a metal sleeve of integral construction having a single longitudinal slit 31 as shown in Fig. 6. By forming the metal part with a slit of appreciable gap, which, preferably, will be closed upon compressing the bearing by pressure of the mold, sufficient room may be provided to permit a tubular rubber lining to be placed in the metal sleeve and a mandrel to be inserted therethrough without axial deformation of the rubber. Upon closing the sleeve in the mold, the rubber will be molded under radial compression and excess rubber will be forced into the slit 31. While the degree of yielding for the relief of tension on the rubber is not so great in this embodiment as in the constructions wherein separate and spaced-apart sections are used the metal may be formed inexpensively from sheet metal, if desired, and the bearing will be satisfactory for many uses.

I claim:

1. The method of making a rubber-lined bearing which comprises molding about a core a continuously annular body of rubber within a circumferentially discontinuous enclosing sleeve structure while simultaneously uniting the body to the sleeve structure, and removing the core therefrom to present the inner rubber surface of the article as a bearing surface.

2. The method of making a rubber lined article which comprises molding about a core a continuously annular body of rubber within a circumferentially discontinuous enclosing sleeve structure, removing the core therefrom to present an inner surface of rubber, and mounting the sleeve structure and rubber within an enclosure with the sleeve portions held pressed toward one another.

3. The method of making a rubber-lined article which comprises molding about a core a continuously annular body of rubber within a circumferentially discontinuous sleeve structure while simultaneously uniting the body to the sleeve structure, the rubber flowing radially outward between adjacent margins of the sleeve portions during the molding, and removing the core from the article to present an inner surface of rubber.

4. The method of making a rubber-lined article which comprises molding about a core a continuously annular body of rubber in vulcanized adhesion with a circumferentially discontinuous enclosing sleeve structure, and removing the core before the rubber has completely cooled from the heat of molding to permit yielding of the assembly to relieve at least partially the tension on the rubber resulting from the shrinkage force thereof and to present an inner surface of rubber.

5. The method of making a rubber-lined article which comprises molding about a core a continuously annular body of rubber in vulcanized adhesion with a circumferentially discontinuous enclosing sleeve structure, the rubber flowing radially outward between adjacent margins of the sleeve portions under the molding pressure, and removing the core before the rubber has completely cooled from the heat of molding to permit yielding of the assembly to relieve at least partially the tension on the rubber resulting from the shrinkage force thereof and to present an inner surface of rubber.

6. The method of making a rubber-lined article which comprises molding about a core a continuously annular body of rubber in vulcanized adhesion with a plurality of spaced-apart circumferentially arranged enclosing sleeve elements while simultaneously uniting the body to the sleeve elements, the rubber flowing radially outward between adjacent margins of the sleeve elements during the molding, and mounting the sleeve structure and rubber within an enclosure with the sleeve portions held pressed toward one another.

7. The method of making a rubber-lined article which comprises molding about a core of generally oval cross-section a continuously annular body of rubber within a circumferentially discontinuous sleeve structure, removing the core to present an inner surface of rubber, and mounting the sleeve structure and rubber in an enclosure with the sleeve portions held pressed toward one another to cause the inner face of the rubber to be changed from generally oval to general circular in form.

8. The method of making a cushioned bearing which comprises molding about a core a continuously annular body of rubber in adhesion with a circumferentially discontinuous conclosing sleeve structure, the rubber flowing radially outward between adjacent margins of the sleeve portions during the molding and permitting the sleeve portions to yield toward one another under the shrinkage force of cooling from the heat of molding.

9. The method of making a rubber-lined shaft bearing which comprises molding about a fluted core a continuously annular body of rubber within a circumferentially discontinuous sleeve structure to provide a rubber bearing face having an axial groove radially aligned with a gap of said sleeve structure, removing the core to provide an inner face of the rubber having longitudinally extending shaft-contacting lands and intermediate grooves, and mounting the sleeve structure and rubber within a shaft housing with the sleeve structure held pressed radially inward.

10. The method of making a rubber-lined shaft bearing which comprises molding about a fluted core a continuously annular body of rubber within a plurality of circumferentially spaced-apart sleeve sections, removing the core to provide an inner face of the rubber having longitudinally extending shaft-contacting lands and intermediate grooves, and mounting the sleeve sections and rubber within a shaft enclosure with the sleeve sections held pressed toward one another.

11. The method of making a rubber-lined shaft bearing which comprises molding about a fluted core a continuously annular body of rubber within a plurality of circumferentially spaced-apart sleeve sections while simultaneously uniting the body to the sleeve sections, the rubber flowing radially outward between adjacent margins of the sleeve sections during the molding, removing the core to provide an inner face of the rubber having longitudinally extending shaft-contacting lands and intermediate grooves some of which are radially aligned with the spaces between the sleeve sections, and mounting the sleeve sections and rubber within a shaft enclosure with the sleeve sections held pressed toward one another.

12. The method of making a rubber-lined shaft bearing which comprises molding about a fluted core a continuously annular body of rubber in vulcanized adhesion with a plurality of spaced-apart enclosing sleeve sections, removing the core to provide an inner face of the rubber having longitudinally-extending shaft-contacting lands and intermediate grooves some of which are radially aligned with the spaces between the sleeve sections, and mounting the sleeve sections and rubber within a shaft enclosure with the sleeve sections held pressed toward one another.

13. The method of making a rubber-lined article which comprises molding about a core a continuously annular body of rubber within a plurality of circumferentially arranged enclosing sleeve sections and simultaneously uniting the sections to said body, removing the core to provide an inner surface of rubber, and separating the rubber between sleeve sections.

14. The method of making a rubber-lined shaft bearing assembly which comprises molding about a fluted core a continuously annular body of rubber in vulcanized adhesion with a plurality of enclosing sleeve sections, removing the core to provide an inner face of the rubber having longitudinally-extending shaft-contacting lands and intermediate grooves, with grooves formed at the zones between adjacent margins of sleeve sections, separating the rubber at said zones, and mounting the rubber-lined sections within a shaft enclosure.

FRED L. HAUSHALTER.